United States Patent
Geveci et al.

(10) Patent No.: US 8,875,490 B2
(45) Date of Patent: Nov. 4, 2014

(54) SYSTEM AND METHOD TO CONTROL SELECTIVE CATALYTIC REDUCTION SYSTEMS IN FEEDBACK

(75) Inventors: Mert Geveci, Albany, NY (US); Andrew Osburn, Nashville, IN (US)

(73) Assignee: Cummins Inc., Columbus, IN (US)

( * ) Notice: Subject to any disclaimer, the term of this patent is extended or adjusted under 35 U.S.C. 154(b) by 236 days.

(21) Appl. No.: 13/424,220

(22) Filed: Mar. 19, 2012

(65) Prior Publication Data

US 2012/0233986 A1     Sep. 20, 2012

Related U.S. Application Data

(60) Provisional application No. 61/454,306, filed on Mar. 18, 2011.

(51) Int. Cl.
*F01N 3/00* (2006.01)
*F01N 3/10* (2006.01)
*F01N 3/20* (2006.01)
*F01N 13/00* (2010.01)

(52) U.S. Cl.
CPC .............. *F01N 3/208* (2013.01); *F01N 3/2066* (2013.01); *F01N 2560/021* (2013.01); *F01N 2560/026* (2013.01); *F01N 2900/1402* (2013.01); *F01N 2900/1411* (2013.01); *F01N 2900/1602* (2013.01); *F01N 2900/1616* (2013.01); *F01N 2900/1621* (2013.01); *Y02T 10/24* (2013.01); *F01N 13/0093* (2014.06)
USPC ................... 60/286; 60/274; 60/276; 60/295; 60/301; 60/303

(58) Field of Classification Search
CPC ....... F01N 3/026; F01N 3/2066; F01N 3/208; F01N 2013/023; F01N 2560/021; F01N 2560/026; F01N 2610/02; F01N 2900/0411; F01N 2900/1402; F01N 2900/1616; F01N 2900/1621; F01N 2900/1622
USPC .................... 60/274, 276, 286, 295, 301, 303
See application file for complete search history.

(56) References Cited

U.S. PATENT DOCUMENTS 6,755,014 B2    6/2004   Kawai et al.
6,904,751 B2    6/2005   Makki et al.
(Continued)

FOREIGN PATENT DOCUMENTS

WO   WO 2010140262 A1 * 12/2010 ................ F01N 3/08

OTHER PUBLICATIONS

International Search Report and Written Opinion, ISA/US, PCT/US2012/029695, Cummins Inc., Jun. 11, 2012.

*Primary Examiner* — Audrey K Bradley
(74) *Attorney, Agent, or Firm* — Krieg DeVault LLP (57) ABSTRACT

A method includes determining a current mid-bed $NH_3$ amount by operating an $NH_3$ sensor positioned at a mid-bed location for an engine aftertreatment system having two SCR catalyst beds. The method further includes operating a $NO_x$ sensor positioned at the mid-bed location, and interpreting a current mid-bed ammonia to $NO_x$ ratio (ANR) and a current mid-bed $NO_x$ in response to the mid-bed $NH_3$ amount and the operating the $NO_x$ sensor. The method further includes correcting an output value of the $NO_x$ sensor for cross-sensitivity to $NH_3$. The method includes determining a mid-bed ANR constraint, determining a feedforward mid-bed $NO_x$ target, and providing a reductant injector command in response to the current mid-bed ANR, the current mid-bed $NO_x$, the ANR constraint, and the feedforward mid-bed $NO_x$ target.

25 Claims, 2 Drawing Sheets

(56) References Cited

U.S. PATENT DOCUMENTS

| | | |
|---|---|---|
| 7,204,081 B2 | 4/2007 | Yasui et al. |
| 7,426,825 B2 | 9/2008 | Viola et al. |
| 2007/0044457 A1* | 3/2007 | Upadhyay et al. .............. 60/295 |
| 2010/0024390 A1 | 2/2010 | Wills et al. |
| 2010/0024393 A1 | 2/2010 | Chi et al. |
| 2010/0199643 A1 | 8/2010 | Yacoub |
| 2011/0265455 A1* | 11/2011 | Hirota et al. ................... 60/285 |
| 2012/0102927 A1* | 5/2012 | Hirota ............................ 60/287 |

* cited by examiner

SYSTEM AND METHOD TO CONTROL SELECTIVE CATALYTIC REDUCTION SYSTEMS IN FEEDBACK

RELATED APPLICATIONS

This application is related to, and claims the benefit of, U.S. Provisional Patent Application 61/454,306 filed on Mar. 18, 2011, entitled METHOD AND APPARATUS TO CONTROL SELECTIVE CATALYTIC REDUCTION SYSTEMS IN FEEDBACK, which is incorporated herein by reference in the entirety for all purposes.

BACKGROUND

The technical field generally relates to engine aftertreatment control systems. Previously known engine aftertreatment control systems include selective catalytic reduction (SCR) systems that divide the SCR catalyst portions into more than one catalyst element, and determine a $NO_x$ or $NH_3$ value between SCR catalyst portions. Previously known engine aftertreatment control systems control the $NO_x$ value between SCR catalyst portions to a minimum possible value, and/or control the $NH_3$ value to a selected $NH_3$ concentration. However, such engine aftertreatment control systems suffer from various limitations, including at least that such systems cannot control the $NH_3$ to $NO_x$ ratio between SCR catalyst portions to a selectable level, and/or control the $NO_x$ amount between SCR catalyst portions to a selectable level. Accordingly, further technological developments are desirable in this area.

SUMMARY

One embodiment is a unique method for controlling reductant injection for an SCR catalyst engine aftertreatment system in feedback to control a mid-bed $NO_x$ amount. Other embodiments include unique methods, systems, and apparatus to control reductant injection for SCR catalyst engine aftertreatment systems, including utilizing a mid-bed $NH_3$ amount in feedback. This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
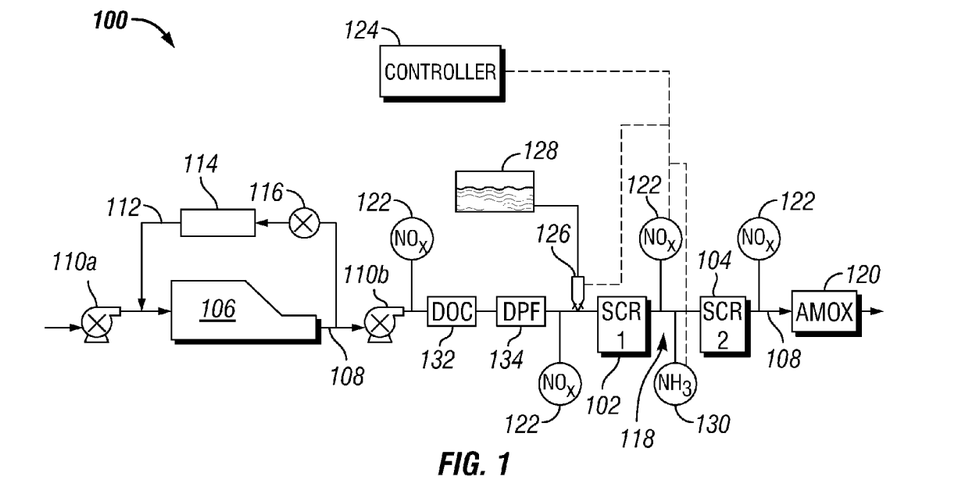
FIG. 1 is a schematic block diagram of a system for controlling an SCR system with mid-bed $NO_x$ feedback.

Referencing FIG. 1, a schematic block diagram of a system 100 for controlling a selective catalytic reduction (SCR) catalyst 102, 104 with mid-bed $NO_x$ feedback is illustrated. The system 100 includes an engine 106 producing an exhaust stream 108 as a byproduct of operation. The exhaust stream 108 includes an amount of $NO_x$ as a constituent therein. The engine 106 may be of any type of combustion engine, including at least a diesel engine, gasoline engine, natural gas engine, and/or a combined fuel engine. The illustrative system 100 includes a turbocharger, with the turbine side 110b illustrated schematically on the right (exhaust side) and the compressor side 110a illustrated schematically on the left (intake side). The illustrative system 100 further includes an exhaust gas recirculation (EGR) path 112 having an EGR cooler 114 and an EGR valve 116 disposed therein. The arrangement and inclusion of the EGR and turbocharger components is illustrative and non-limiting.

The system 100 further includes an SCR catalyst component 102, 104 having a mid-bed position 118 between two segments of the SCR catalyst—labeled "SCR 1" 102 and "SCR 2" 104 in the illustration of FIG. 1. The mid-bed position 118 is downstream of at least one SCR catalyst component (or segment thereof) and upstream of at least one SCR catalyst component (or segment thereof), but otherwise the mid-bed position 118 is non-limiting and may include additional SCR catalyst components or segments upstream, downstream, or in parallel or bypass flow segments of the exhaust stream 108.

The ratio of the SCR 1 102 to the SCR 2 104 (e.g. amount of catalytic material present within each element) may be any value where at least a significantly measurable amount of $NO_x$ is converted in the SCR 1 102 during nominal operating conditions of the system 100. Exemplary values include a 5:95 ratio (SCR 1:SCR 2) of the catalytic conversion capability of the system, a 10:90 ratio, a 20:80 ratio, a 25:75 ratio, a 30:70 ratio, a 40:60 ratio, a 50:50 ratio, a 60:40 ratio, a 70:30 ratio, a 75:25 ratio, an 80:20 ratio, a 90:10 ratio, and a 95:5 ratio. A higher ratio of the catalytic conversion capability in the SCR 1 102 component improves final control robustness to disturbances, modeling errors, reductant injection errors, catalyst degradation, etc. A higher ratio of the catalytic conversion capability in the SCR 2 104 component improves responsiveness of the system 100 and reduces the occurrence and magnitude of $NH_3$ or $NO_x$ slip as emissions from the system. An example system 100 further includes an ammonia oxidation catalyst 120 (AMOX—not shown) positioned downstream of the SCR 2 104 component. The AMOX 120 component, when present, oxidizes a portion of incident NH3 to NOx, reducing the slip of any $NH_3$ while increasing $NO_x$ emissions of the system 100. Accordingly, a maximum amount of $NH_3$ passing to the AMOX 120 may be indicated, and may depend upon $NH_3$ and/or $NO_x$ emissions limitations or constraints.

The system 100 includes a $NO_x$ determination at the mid-bed position, which is illustrated with a $NO_x$ sensor 122 in communication with a controller 124 in the illustrative system. Any type of $NO_x$ sensor 122 known in the art is contemplated herein.

Additional or alternative embodiments of the system 100 include a reductant injector 126 (or a reductant doser) positioned to inject reductant at a position upstream of the SCR catalyst component 102, 104 segment that is upstream of the mid-bed position 118. The reductant injector 126 is in fluid communication with a reductant source 128, and is controllable by the controller 124. The reductant includes any type of reductant known in the art, including at least ammonia ($NH_3$), urea, and/or a hydrocarbon. Where the description herein includes ammonia or an ammonia-to-$NO_x$ ratio (ANR), the description further contemplates $NH_3$-generating compound (including at least urea), and further contemplates a reductant-to-$NO_x$ ratio (e.g. hydrogen to $NO_x$) except where operations are necessarily exclusive to $NH_3$, as will be understood to one of skill in the art. An example includes operations to correct for $NH_3$ to $NO_x$ cross-sensitivity for a $NO_x$ sensor 122, which is not present where the reductant is a hydrocarbon.

The exemplary system 100 further includes a mid-bed $NH_3$ sensor 130 positioned, and operationally coupled to the exhaust stream 108, at the mid-bed position 118. The mid-bed $NH_3$ sensor 130 is optional, and may be utilized where the reductant is $NH_3$ or an $NH_3$ generating reductant. In certain embodiments, the reductant is $NH_3$ or an $NH_3$ generating reductant, and a mid-bed $NH_3$ sensor 130 is not present. A non-limiting example includes a system 100 wherein the $NO_x$ sensor 122 is not cross-sensitive to $NH_3$.

The exemplary system 100 further includes an oxidation catalyst (DOC) 132 and/or a particulate filter (DPF) 134. The use of the DOC 132 and/or DPF 134 are optional, and the illustrative positions of the DOC 132 and/or the DPF 134 are non-limiting. Further, the system 100 may include additional or alternative aftertreatment components that are not illustrated in FIG. 1. The system additionally or alternatively may include a $NO_x$ sensor 122 positioned upstream of the DPF 134 and/or the DOC 132 to determine engine-out $NO_x$. Alternatively, the engine-out $NO_x$ may be modeled, calculated from an engine operation map, and/or measured from a different location than the sensor illustrated in FIG. 1. The system 100 may further include a $NO_x$ sensor 122 positioned downstream of the SCR 2 104 component to determine system-out $NO_x$ and/or AMOX 120 input $NO_x$. The system 100 may further include a $NO_x$ sensor 122 positioned upstream of the reductant injector. Additional $NO_x$ sensors 122 may be present, and various $NO_x$ sensors 122 illustrated may not be present. Further, $NO_x$ sensors 122 present need not be of the same type or capability.

The exemplary 100 system further includes the controller 124 structured to functionally execute operations to control the SCR system. The controller 124 includes a number of modules structured to functionally execute the operations of the controller 124, and an exemplary controller 124 includes a system conditions module, a $NO_x$ modeling module, a $NO_x$ reference module, a $NO_x$ error determination module, a $NO_x$ control module, and/or a doser control determination module. In certain embodiments, the controller 124 forms a portion of a processing subsystem including one or more computing devices having memory, processing, and communication hardware. The controller 124 may be a single device or a distributed device, and the functions of the controller 124 may be performed by hardware or software.

The description herein including modules emphasizes the structural independence of the aspects of the controller 124, and illustrates one grouping of operations and responsibilities of the controller 124. Other groupings that execute similar overall operations are understood within the scope of the present application. Modules may be implemented in hardware and/or software on computer readable medium, and modules may be distributed across various hardware or software components. More specific descriptions of certain embodiments of controller operations are included in the section referencing FIG. 3.

Certain operations are described herein as interpreting one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a computer readable medium, receiving the value as a run-time parameter by any means known in the art, and/or by receiving a value by which the interpreted parameter can be calculated, and/or by referencing a default value that is interpreted to be the parameter value.

An example controller 124 interprets an SCR catalyst space velocity, an SCR catalyst temperature, and an engine $NO_x$ output amount. In response to the SCR catalyst space velocity, the SCR catalyst temperature, and the engine $NO_x$ output amount, the controller 124 determines a feedforward mid-bed $NO_x$ target and mid-bed ANR constraint. The controller interprets a current mid-bed ANR and a current mid-bed $NO_x$, and in response to the mid-bed ANR constraint, and the current mid-bed ANR, the controller adjusts the feedforward mid-bed $NO_x$ target. The controller further determines a $NO_x$ error term in response to the adjusted mid-bed $NO_x$ target and the current mid-bed $NO_x$. The controller further provides an ANR command in response to the $NO_x$ error term. The reductant injector is responsive to the ANR command.

Figure 2:
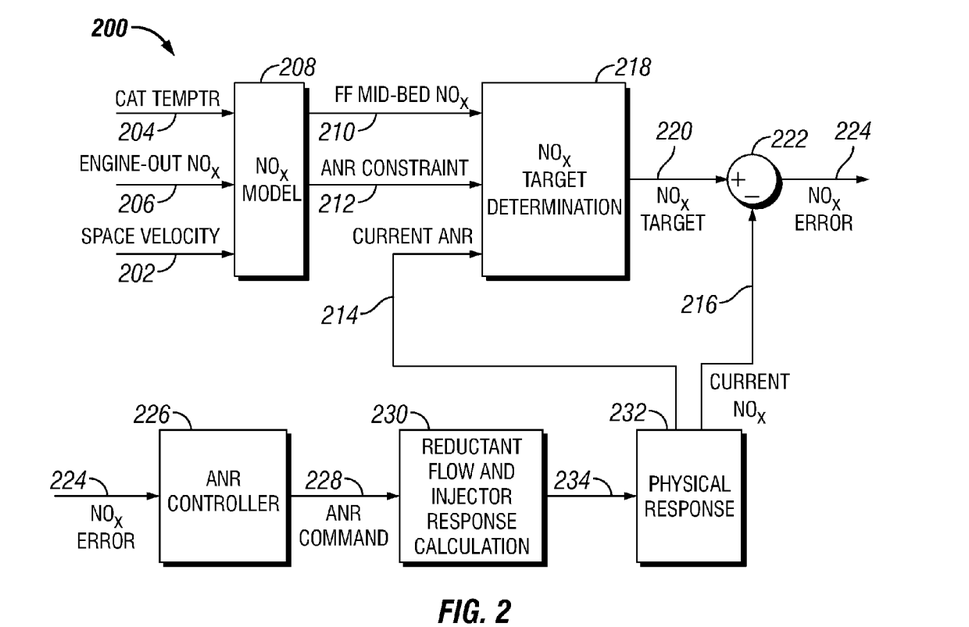
FIG. 2 is a schematic flow diagram of a control operation for an SCR system.

The descriptions which follow, and the schematic control diagram in FIG. 2, provide an illustrative embodiment of performing procedures for controlling SCR systems with a mid-bed $NO_x$ feedback. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a computer readable medium, where the computer program product comprises instructions causing the computer to execute one or more of the operations, or to issue commands to other devices to execute one or more of the operations.

An exemplary procedure 200 includes an operation to interpret an SCR catalyst space velocity 202, an SCR catalyst temperature 204, and an engine $NO_x$ output amount 206. The SCR catalyst space velocity 202 is a value relating the amount of SCR catalyst available for reacting $NO_x$ relative to the flow volume of the exhaust gases through the SCR catalyst element. The SCR catalyst space velocity 202 may be a value determined from an entire catalyst amount for all SCR elements, and/or a value determined from the SCR catalyst element(s) upstream of the mid-bed position. The SCR catalyst space velocity 202 may be in any units understood in the art, including without limitation exhaust mass flow or exhaust volumetric flow per unit of catalyst mass or catalyst bed volume.

The SCR catalyst temperature 204 is a temperature in the system that is descriptive of, or that can be related to, a temperature of the SCR catalyst. A bulk bed temperature of the SCR catalyst element, an entry temperature of the SCR catalyst element, a mid-bed temperature of the SCR catalyst element, and/or a temperature of at the SCR catalyst surface are contemplated as exemplary SCR catalyst temperatures 204. The SCR catalyst temperature 204 may include one or more temperatures in an average or weighted average. The SCR catalyst temperature 204 may be determined from one or more sensors, and/or one or more models or estimates.

The engine out $NO_x$ output amount 206 is a description of the amount of $NO_x$ produced by the engine. The engine out $NO_x$ output amount 206 may be determined by a sensor, a model of the engine $NO_x$ production, a map of the engine $NO_x$ output amount according to specified operating conditions, and/or by any other method understood in the art. In certain embodiments, a $NO_x$ sensor positioned upstream of the SCR catalyst element provides the engine out $NO_x$ output amount 206.

In response to the SCR catalyst space velocity 202, the SCR catalyst temperature 204, and the engine $NO_x$ output amount 206, the procedure 200 includes an operation 208 to determine a feedforward mid-bed $NO_x$ target 210 and mid-bed ammonia to $NO_x$ ratio (ANR) constraint 212. The feedforward mid-bed $NO_x$ target 210 may be determined by any criteria understood in the art. An exemplary operation to determine the feedforward mid-bed $NO_x$ target 210 includes determining a NOx conversion contribution of the SCR catalyst element portion upstream of the mid-bed position, and determining the resulting mid-bed $NO_x$ amount resulting from the engine out $NO_x$ output amount and the $NO_x$ conversion contribution. For example, if the engine out $NO_x$ output amount 206 is 100 units of $NO_x$, of which the $NO_x$ conversion contribution of the upstream SCR catalyst element portion is 30 units, and the $NO_x$ conversion contribution of the downstream SCR catalyst element portion is 60 units (e.g. emissions will be 10 units of $NO_x$ plus the AMOX contribution, if any), the feedforward mid-bed $NO_x$ target 210 is 70 units of $NO_x$. The expected or designed contributions of the upstream and downstream portions of the SCR catalyst elements are known to one of skill in the art contemplating a specific system, and may depend upon the emissions requirements for the system, the sizing and catalyst loading of the SCR catalyst elements upstream and downstream of the mid-bed position, the current temperatures of the SCR catalyst elements, and/or other criteria understood in the art.

The operation 208 to determine the mid-bed ammonia to ANR constraint 212 includes limiting the mid-bed ANR to a selectable upper and/or lower limit. For example, the mid-bed ANR may be limited to a lower limit of 0.7 and an upper limit of 1.3 times the stoichiometric ANR. The upper and lower limit are selected according to the desired control characteristics, and may further be selected according to $NO_x$ or ammonia slip limits downstream of the SCR catalyst components.

A high ANR upper limit provides for responsive filling of the SCR catalyst component $NH_3$ storage capacity, and provides a substantial $NH_3$ concentration at the mid-bed position which may improve the $NH_3$ measurement accuracy. However, a high ANR upper limit also increases the possibility and amount of $NH_3$ slip past the SCR catalyst component. A low ANR lower limit provides for responsive emptying of the SCR catalyst component $NH_3$ storage capacity, and ensures that the actual ANR is lower than the stoichiometric ANR even in the presence of substantial errors in the measurements and/or estimates of $NO_x$ at the engine out, $NO_x$ at the mid-bed, and/or $NH_3$ at the mid-bed. However, a low ANR lower limit also increases the possibility and amount of $NO_x$ emissions.

One of skill in the art, having the benefit of the disclosures herein, can readily determine high and low ANR constraints for a contemplated system. Simple data gathering at certain operating conditions, including high or low system temperatures, high or low system flow rates, and/or high or low $NO_x$ output amounts, may be desirable to set appropriate ANR constraints. Exemplary and non-limiting low ANR constraints include 0.95, 0.9, 0.7, 0.5, and/or 0.3 ANR. Exemplary and non-limiting high-ANR constraints include 1.02, 1.05, 1.1, 1.5, 1.9, 2, 3, and 5 ANR. The high and low ANR constraints 212 may be a selected value from a plurality of values dependent upon the current operating conditions, and/or the high or low ANR constraints 212 may only be applied at certain operating conditions. In certain embodiments, the procedure includes adjusting the ANR constraints 212 in response to a system fault or failure.

The exemplary procedure 200 further includes an operation to interpret a current mid-bed ANR 214 and a current mid-bed $NO_x$ 216. The current mid-bed $NO_x$ 216 is, in an exemplary embodiment, determined from a $NO_x$ sensor, and may further be determined from an $NH_3$ sensor. In certain embodiments, the $NO_x$ sensor is cross-sensitive to $NH_3$, and the amount of $NO_x$ determined according to the $NO_x$ sensor is reduced by an amount determined from the $NH_3$ sensor. For example, if the $NO_x$ sensor detects 100 units of $NO_x$, and from the $NH_3$ sensor it is determined that 20 units of the $NO_x$ are attributable to the presence of $NH_3$, the procedure 200 includes interpreting the current mid-bed $NO_x$ 216 as 80 units of $NO_x$. The current mid-bed ANR 214 is determined from the current amount of $NO_x$ 216 and the current amount of $NH_3$ (not shown), compared to the stoichiometric amount of $NH_3$ (not shown). For example, if 100 units of $NO_x$ are present, 90 units of $NH_3$ are present, and the stoichiometric amount of $NH_3$ is 100 units of $NH_3$, the current mid-bed ANR 214 is 0.9. One of skill in the art will recognize that the stoichiometric amount of $NH_3$ is dependent upon the units of the $NH_3$ and $NO_x$ measurements (e.g. mass, moles, etc.), the composition of the present $NO_x$ (e.g. the ratio of $NO:NO_2$), and other parameters understood in the art.

The exemplary procedure 200 further includes an operation 218 to adjust the feedforward mid-bed $NO_x$ target 210 in response to the mid-bed ANR constraint 212 and the current mid-bed ANR 214. For example, if the mid-bed ANR constraint 212 indicates a required $NO_x$ amount that is greater or less than the feedforward mid-bed $NO_x$ target 210, the mid-bed $NO_x$ target 220 is limited to a $NO_x$ amount that is consistent with the mid-bed ANR constraint 212, and/or the mid-bed $NO_x$ target 220 is adjusted to progress at an acceptable rate toward the $NO_x$ amount that is consistent with the mid-bed ANR constraint 212. If the current mid-bed ANR 214 indicates an amount that is inconsistent with the mid-bed ANR constraint 212, the feedforward mid-bed $NO_x$ target 220 may be adjusted to bring the mid-bed ANR 214 into conformance with the mid-bed ANR constraint 212. Additionally, if the current mid-bed ANR 214 indicates an amount that is inconsistent with the expected mid-bed ANR that should result from the feedforward mid-bed $NO_x$ target 220, the feedforward mid-bed $NO_x$ target 220 may likewise be adjusted in a manner according to the observed mid-bed ANR 214. For example, if the feedforward mid-bed $NO_x$ target 220 indicates that the mid-bed ANR should be 1.5, but the observed mid-bed ANR 214 is 2.0, the feedforward mid-bed $NO_x$ target 220 may be increased (resulting in a greater $NO_x$ remainder at the mid-bed).

The exemplary procedure 200 further includes an operation 222 to determine a $NO_x$ error term 224 in response to the adjusted mid-bed $NO_x$ target 220 and the current mid-bed $NO_x$ 216. The error term 224 may be a difference of the adjusted mid-bed $NO_x$ target 220 and the current mid-bed $NO_x$ 216 as illustrated in FIG. 2, or a value determined in response to, or as a function of, the difference of the adjusted mid-bed $NO_x$ target 220 and the current mid-bed $NO_x$ 216.

The exemplary procedure 200 further includes an operation 226 to provide an ANR command 228 in response to the $NO_x$ error term 220. The operation 226 to provide the ANR command 228 may include a control operation 226 utilizing a PI, PID, fuzzy logic, or other control element(s) understood in the art. In certain embodiments, the operation 226 to provide the ANR command 228 includes selecting one of a high ANR value or a low ANR value depending upon the sign of the error value, or upon other criteria such as a magnitude of the error value, or a determination that the $NH_3$ storage on the SCR catalyst component should be increasing or decreasing. Additionally or alternatively, the control element(s) may select from additional discrete ANR values, such as a nominal ANR value, a very high ANR value, and/or a very low ANR value. In certain embodiments, the control element(s) select a continuous or semi-continuous ANR value (e.g. from a plurality of ANR values according to a fixed point digital numerical value, one of a number of values from a look-up table, etc.) as an output of the control operation 226. Any other operation to determine an ANR command 228 in response to a $NO_x$ error 224 is contemplated herein.

The exemplary procedure 200 further includes an operation 230 to control the reductant doser in response to the ANR command 228. The operation 230 to control the reductant doser in response to the ANR command 228 includes an operation to inject an amount of reductant that achieves the ANR command 228 amount of reductant, and/or that acceptably progresses toward the ANR command 228 amount of reductant. The reductant doser may be a device that delivers a continuous, discrete, or binary amount of reductant, and the operation 230 to control the reductant doser may provide discrete, binary, continuous, digital, PWM, and/or any other type of command to the reductant doser in response to the ANR command 228.

An exemplary procedure 200 includes determining the current mid-bed ANR 214 and/or the current mid-bed $NO_x$ 216 by operating a $NO_x$ sensor positioned at the mid-bed. The system physical response 232 includes any sensors or actuators, accepting the reductant injection commands 234 and providing the resulting current mid-bed $NO_x$ 216 and current mid-bed ANR 214. In certain embodiments, the procedure 200 further includes determining the current mid-bed ANR 214 and/or the current mid-bed $NO_x$ 216 further by operating an $NH_3$ sensor positioned at the mid-bed.

Figure 3:
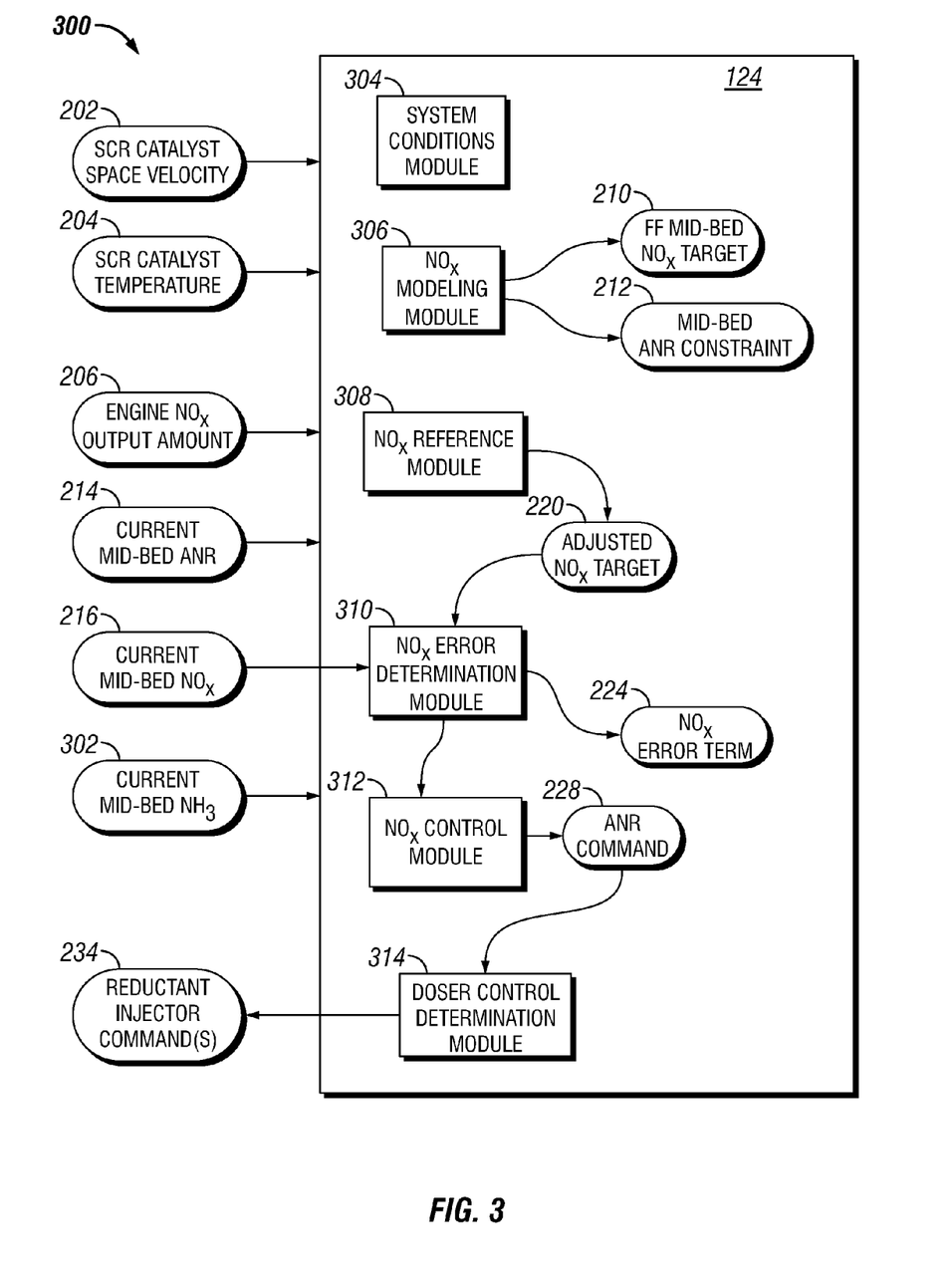
FIG. 3 is a schematic block diagram of an apparatus for controlling an SCR system with mid-bed $NO_x$ feedback.

Referencing FIG. 3, a processing subsystem 300 includes a controller 124 having a system conditions module 304 that interprets an SCR catalyst space velocity 202, an SCR catalyst temperature 204, and an engine $NO_x$ output amount 206. In response to the SCR catalyst space velocity 202, the SCR catalyst temperature 204, and the engine $NO_x$ output amount 206, a $NO_x$ modeling module 306 determines a feedforward mid-bed $NO_x$ target 210 and mid-bed ANR constraint 212. An exemplary $NO_x$ modeling module 306 determines the feedforward mid-bed $NO_x$ target 210 and the mid-bed ANR constraint 212 according to lookup tables based on the current operating conditions from the system conditions module 304, and/or by modeling the mid-bed $NO_x$ value that, with additional $NO_x$ conversion in the downstream SCR component (e.g. SCR 2) achieves the overall target $NO_x$ emissions for the system. Any other method of determining a feedforward mid-bed $NO_x$ target 220 is contemplated herein.

The controller 124 further includes the system conditions module 304 interpreting a current mid-bed ANR 214 and a current mid-bed $NO_x$ 216. A $NO_x$ reference module 308 provides an adjusted mid-bed $NO_x$ target 220 in response to the mid-bed ANR constraint 212 and the current mid-bed ANR 214. In certain embodiments, a $NO_x$ error determination module 310 determines a $NO_x$ error term 224 in response to the adjusted mid-bed $NO_x$ target 220 and the current mid-bed $NO_x$ 216, and a $NO_x$ control module 312 provides an ANR command 228 in response to the $NO_x$ error term 224.

The reductant injector is responsive to the ANR command 228. In certain embodiments, the controller 124 includes a doser control determination module 314 that calculates reductant injector commands 234 that, under the current operating conditions, provide reductant sufficient to achieve the ANR command 228 at the mid-bed position, and/or to proceed acceptably toward achieving the ANR command 228 at the mid-bed position. Thereby, the reductant injector is responsive to the ANR command 228 by injecting reductant according to the reductant injector command(s) 234.

Again referencing FIG. 2, a schematic flow diagram of a control operation 200 for an SCR system is illustrated. The organization and grouping of operations in the schematic flow diagram of FIG. 2 is exemplary, and operations may be rearranged, divided, omitted, substituted, and/or combined while providing overall similar functionality of the operations. A $NO_x$ modeling operation 208 (or lookup table, constraint management algorithm, or other operational construct) receives a catalyst temperature 204 of the SCR catalyst component, an engine-out $NO_x$ amount 206, and a space velocity 202 of the SCR catalyst component. The $NO_x$ modeling operation 208 calculates or returns a feedforward mid-bed $NO_x$ 210 and an ANR constraint 212.

A $NO_x$ target determination operation 218 determines a mid-bed $NO_x$ target 220 in response to the feedforward mid-bed $NO_x$ target 210, the ANR constraint(s) 212, and a current ANR 214 at the mid-bed position. An error determination operation 222 determines an error value 224 of the mid-bed $NO_x$ value ($NO_x$ amount, $NO_x$ concentration, $NO_x$ flow rate, or other $NO_x$ quantity description) based on the mid-bed $NO_x$ target 220 and the current $NO_x$ at the mid-bed 216. An ANR controller 226, which may include any control operations known in the art to provide a response value 228 determined according to an error value 224, determines an ANR command 228 in response to the $NO_x$ error value 224.

A reductant flow and injector response calculation operation 230 determines injector commands 234 in response to the ANR command 228. A reductant injector is responsive to the injector commands 234 to provide reductant to the exhaust stream at a position upstream of the SCR catalyst component (s). The physical response 232 block in the schematic diagram of FIG. 2 is illustrative of the physical plant of the system. The injector commands 234 are received, the injector provides the reductant to the exhaust stream, and the resulting current mid-bed $NO_x$ amount 216 and current mid-bed ANR 214 are provided to the control operations as illustrated. Where the physical response 232 is unavailable, for example at system start-up where no current $NO_x$ measure 216 is yet available, a default or initialized value for the current mid-bed ANR 214 and/or current $NO_x$ amount 216 may be utilized, as understood in the art.

As is evident from the figures and text presented above, a variety of embodiments according to the present disclosure are contemplated.

An example set of embodiments is a method including an operation to determine a mid-bed ammonia to $NO_x$ ratio (ANR) constraint for an engine aftertreatment system having at least two SCR catalyst beds. The example method further includes an operation to determine a feedforward mid-bed $NO_x$ target, and an operation to interpret a current mid-bed ANR and a current mid-bed $NO_x$. The method further includes, in response to the current mid-bed ANR, the current mid-bed $NO_x$, the ANR constraint, and the feedforward mid-bed $NO_x$ target, an operation to provide a reductant injector command. In certain further embodiments, the method includes an operation to control a reductant injector in response to the reductant injector command.

Certain further operations present in example embodiments of the method are described following. Certain embodiments include an operation to interpret an SCR catalyst space velocity, an SCR catalyst temperature, and an engine $NO_x$ output amount, and the operation to determine the mid-bed ANR constraint is in response to the SCR catalyst space velocity, SCR catalyst temperature, and the engine $NO_x$ output amount. In certain alternative or additional embodiments, the operation to determine the feedforward mid-bed $NO_x$ target is in response to the SCR catalyst space velocity, SCR catalyst temperature, and the engine $NO_x$ output amount. In certain embodiments, the method includes an operation to determine an adjusted mid-bed $NO_x$ target in response to the feedforward mid-bed $NO_x$ target, the ANR constraint, and the current mid-bed ANR. In certain further embodiments, the method includes an operation to determine a $NO_x$ error term in response to the adjusted mid-bed $NO_x$ target and the current mid-bed $NO_x$, and may further include an operation to determine a mid-bed ANR command in response to the $NO_x$ error term, and an operation to provide the reductant injector command in response to the mid-bed ANR command.

An example method includes the operation to interpret the current mid-bed $NO_x$ including operating a $NO_x$ sensor positioned at the mid-bed. Additionally or alternatively, the operation to interpret the current mid-bed ANR and the current mid-bed $NO_x$ further includes operating an $NH_3$ sensor positioned at the mid-bed. In certain embodiments, an amount of the $NO_x$ detected by the $NO_x$ sensor is attributable to the amount of $NH_3$ present at the mid-bed, and the $NH_3$ (or a fraction thereof, according to the cross-sensitivity profile of the $NO_x$ sensor) detected by the $NH_3$ sensor is subtracted from the $NO_x$ sensor output before the mid-bed $NO_x$ and mid-bed ANR values are determined.

Another example set of embodiments is a system including an engine that produces an exhaust stream as a byproduct of operation, an SCR catalyst component having a mid-bed position between two segments of SCR catalyst, the SCR catalyst component positioned to receive all or part of the exhaust stream. The system further includes a mid-bed $NO_x$ sensor that provides a current mid-bed $NO_x$ amount, and a mid-bed $NH_3$ sensor that provides a mid-bed $NH_3$ amount, each of the mid-bed sensors operationally coupled to the exhaust stream at the mid-bed position. The mid-bed $NO_x$ amount may be a directly utilized $NO_x$ amount, and/or may be corrected for $NH_3$ cross-sensitivity. The system further includes a controller included as a portion of a processing subsystem, the controller having modules structured to functionally execute operations for controlling a reductant injector. Certain embodiments of the system includes a reductant injector that provides reductant utilized to reduce $NO_x$ in the SCR catalyst component.

An example controller includes a system conditions module that interprets the current mid-bed $NO_x$ amount, the current mid-bed $NH_3$ amount, and a current mid-bed ANR. The controller further includes a $NO_x$ modeling module that determines a feedforward mid-bed $NO_x$ target and a mid-bed ANR constraint, and a $NO_x$ control module that provides an ANR command in response to the feedforward mid-bed $NO_x$ target. In certain embodiments, the reductant injector is operatively coupled to a reductant source and to the exhaust stream at a position upstream of the SCR catalyst component, and the reductant injector is responsive to the ANR command. In certain embodiments, the $NO_x$ control module provides the ANR command as reductant commands configured to cause the reductant injector to provide reductant amounts that achieve, approximate, and/or acceptably progress toward achieving the feedforward mid-bed $NO_x$ target.

In certain embodiments, the $NO_x$ control module provides the ANR command as reductant commands configured to cause the reductant injector to provide reductant amounts that achieve, approximate, and/or acceptably progress toward achieving a mid-bed $NO_x$ target determined from information including the feedforward mid-bed $NO_x$ target, and further including additional information such as ANR constraints, system physical limitations, fault information, catalyst $NH_3$ storage and release information, and/or catalyst activity information. The catalyst activity information includes activity of an upstream oxidation catalyst (not shown—e.g. temperature generation, NO to $NO_2$ conversion information, etc.), catalytic activity on an upstream DPF, $NO_x$ conversion rates on any of the SCR catalyst elements, and/or $NH_3$ conversion rates on a downstream AMOX catalyst (not shown).

An example system includes the system conditions module further interpreting an SCR catalyst space velocity, an SCR catalyst temperature, and an engine $NO_x$ output amount, where the $NO_x$ modeling module further determines the ANR constraint in response to the SCR catalyst space velocity, the SCR catalyst temperature, and the engine $NO_x$ output amount. Additionally or alternatively, the $NO_x$ modeling module further determines the feedforward mid-bed $NO_x$ target in response to the SCR catalyst space velocity, the SCR catalyst temperature, and the engine $NO_x$ output amount.

In certain further embodiments, the controller includes a $NO_x$ reference module that provides an adjusted feedforward mid-bed $NO_x$ target in response to the mid-bed ANR constraint and the current mid-bed ANR, where the $NO_x$ control module further provides the ANR command in response to the adjusted feedforward mid-bed $NO_x$ target. An example system further includes the controller having a $NO_x$ error determination module that determines a $NO_x$ error term in response to the adjusted mid-bed $NO_x$ target and the current mid-bed $NO_x$, where the $NO_x$ control module further provides the ANR command in response to the $NO_x$ error term. In still further embodiments, an example system includes the system conditions module further correcting the current mid-bed $NO_x$ amount for $NH_3$ cross-sensitivity in response to the current mid-bed $NH_3$ amount.

In certain embodiments, the system includes an upstream $NO_x$ sensor operationally coupled to the exhaust stream at a position upstream of the SCR catalyst component, where the upstream $NO_x$ sensor provides the engine $NO_x$ output amount. Additionally or alternatively, the system includes one or more of any other engine $NO_x$ output amount determination devices or procedures, including at least utilizing the mid-bed $NO_x$ sensor and mid-bed $NH_3$ sensor combined with modeling of $NO_x$ affecting aspects of any upstream components (e.g. oxidation catalyst, DPF and/or catalyzed DPF, storage and/or conversion on any upstream SCR catalyst elements). In certain further embodiments, the system includes a particulate filter (e.g. a DPF) positioned upstream of the SCR catalyst component. An upstream NOx sensor may be positioned upstream or downstream of the particulate filter. In certain embodiments, the system includes a particulate filter positioned downstream of the SCR catalyst component.

Yet another example set of embodiments is a method including an operation to determine a current mid-bed $NH_3$ amount, where determining the mid-bed $NH_3$ amount includes operating an $NH_3$ sensor positioned at a mid-bed location for an engine aftertreatment system having at least two SCR catalyst beds. The method further includes operating a $NO_x$ sensor positioned at the mid-bed location, an operation to interpret a current mid-bed ANR and a current mid-bed $NO_x$ in response to the mid-bed $NH_3$ amount and the operating the $NO_x$ sensor, where the operation to interpret the current mid-bed ANR and a current mid-bed $NO_x$ further includes an operation to correct an output value of the $NO_x$ sensor for cross-sensitivity to $NH_3$. The method further includes an operation to determine a mid-bed ammonia to $NO_x$ ratio (ANR) constraint, an operation to determine a feedforward mid-bed $NO_x$ target, and an operation to provide a reductant injector command in response to the current mid-bed ANR, the current mid-bed $NO_x$, the ANR constraint, and the feedforward mid-bed $NO_x$ target.

In certain embodiments, the method includes an operation to interpret an SCR catalyst space velocity, an SCR catalyst temperature, and an engine $NO_x$ output amount, and the operation to determine the mid-bed ANR constraint is in response to the SCR catalyst space velocity, the SCR catalyst temperature, and the engine $NO_x$ output amount. Additionally or alternatively, the operation to determine the engine $NO_x$ output amount includes operating an upstream $NO_x$ sensor positioned upstream of the SCR catalyst beds, determining a $NO_x$ conversion amount of an upstream SCR catalyst bed of the SCR catalyst beds, and/or modeling an engine $NO_x$ output amount in response to current engine operating conditions.

In certain embodiments, the operation to determine the mid-bed ANR constraint includes one or more of the operations including: an operation to determine an $NH_3$ conversion capacity of an AMOX positioned downstream of the SCR catalyst beds, an operation to determine an $NH_3$ storage capacity of a downstream SCR catalyst bed of the SCR catalyst beds, an operation to determine a $NO_x$ conversion rate of a downstream SCR catalyst bed of the SCR catalyst beds, an operation to determine an $NH_3$ slip amicability limit value (e.g. a sociability limit or other "soft" limit to $NH_3$ output from the system), and an operation to determine an $NH_3$ emissions limit value (e.g. a regulatory, safety, contracted, or other "hard" limit to $NH_3$ output from the system).

While the invention has been illustrated and described in detail in the drawings and foregoing description, the same is to be considered as illustrative and not restrictive in character, it being understood that only certain exemplary embodiments have been shown and described, and that all changes and modifications that come within the spirit of the inventions are desired to be protected. It should be understood that the scope of the invention is defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
    determining a mid-bed ammonia to $NO_x$ ratio (ANR) constraint for an engine aftertreatment system having at least two SCR catalyst beds;
    determining a feedforward mid-bed $NO_x$ target;
    interpreting a current mid-bed ANR and a current mid-bed $NO_x$;
    in response to the current mid-bed ANR, the current mid-bed $NO_x$, the ANR constraint, and the feedforward mid-bed $NO_x$ target, providing a reductant injector command; and
    injecting a reductant into the engine aftertreatment system in response to the reductant injector command.

2. The method of claim 1, further comprising controlling a reductant injector in response to the reductant injector command.

3. The method of claim 1, further comprising interpreting an SCR catalyst space velocity, an SCR catalyst temperature, and an engine $NO_x$ output amount, wherein the determining the mid-bed ANR constraint is in response to the SCR catalyst space velocity, SCR catalyst temperature, and the engine $NO_x$ output amount.

4. The method of claim 1, wherein the interpreting the current mid-bed $NO_x$ further comprises operating a $NO_x$ sensor positioned at the mid-bed.

5. The method of claim 4, wherein the interpreting the current mid-bed ANR and the current mid-bed $NO_x$ further comprises operating an $NH_3$ sensor positioned at the mid-bed.

6. The method of claim 1, further comprising interpreting an SCR catalyst space velocity, an SCR catalyst temperature, and an engine $NO_x$ output amount, wherein the determining the feedforward mid-bed $NO_x$ target is in response to the SCR catalyst space velocity, SCR catalyst temperature, and the engine $NO_x$ output amount.

7. The method of claim 6, further comprising determining an adjusted mid-bed $NO_x$ target in response to the feedforward mid-bed $NO_x$ target, the ANR constraint, and the current mid-bed ANR.

8. The method of claim 7, further comprising determining a $NO_x$ error term in response to the adjusted mid-bed $NO_x$ target and the current mid-bed $NO_x$.

9. The method of claim 8, further comprising determining a mid-bed ANR command in response to the $NO_x$ error term, and wherein the providing the reductant injector command is in response to the mid-bed ANR command.

10. A method, comprising:
    determining a current mid-bed $NH_3$ amount, the determining the current mid-bed $NH_3$ amount including operating an $NH_3$ sensor positioned at a mid-bed location for an engine aftertreatment system having at least two SCR catalyst beds;
    operating a $NO_X$ sensor positioned at the mid-bed location;
    interpreting a current mid-bed ammonia to $NO_X$ ratio (ANR) and a current mid-bed $NO_X$ in response to the current mid-bed $NH_3$ amount and the operating the $NO_X$ sensor, the interpreting the current mid-bed ANR and a current mid-bed $NO_X$ further including correcting an output value of the $NO_X$ sensor for cross-sensitivity to $NH_3$;
    determining a mid-bed ANR constraint;
    determining a feedforward mid-bed $NO_X$ target;
    in response to tile current mid-bed ANR, the current mid-bed $NO_X$, the ANR constraint, and the feedforward mid-bed $NO_X$ target, providing a reductant injector command; and
    using a reductant injector to inject a reductant into the aftertreatment system in response to the reductant injector command.

11. The method of claim 10, wherein the determining the mid-bed ANR constraint comprises at least one operation selected from the operations consisting of: determining an $NH_3$ conversion capacity of an ammonia oxidation catalyst positioned downstream of the SCR catalyst beds, determining an $NH_3$ storage capacity of a downstream SCR catalyst bed of the SCR catalyst beds, determining a $NO_x$ conversion rate of a downstream SCR catalyst bed of the SCR catalyst beds, determining an $NH_3$ slip amicability limit value, and determining an $NH_3$ emissions limit value.

12. The method of claim 10, further comprising interpreting an SCR catalyst space velocity, an SCR catalyst temperature, and an engine $NO_x$ output amount, wherein the determining the mid-bed ANR constraint is in response to the SCR catalyst space velocity, the SCR catalyst temperature, and the engine $NO_x$ output amount.

13. The method of claim 12, wherein determining the engine $NO_x$ output amount comprises at least one operation selected from the operations consisting of: operating an upstream $NO_x$ sensor positioned upstream of the SCR catalyst beds, determining a $NO_x$ conversion amount of an upstream SCR catalyst bed of the SCR catalyst beds, and modeling an engine $NO_x$ output amount in response to current engine operating conditions.

14. A system, comprising:
an engine producing an exhaust stream as a byproduct of operation;
an SCR catalyst component having a mid-bed position between two segments of SCR catalyst, the SCR catalyst component positioned to receive at least a portion of the exhaust stream;
a mid-bed $NO_x$ sensor that provides a current mid-bed $NO_x$ amount, and a mid-bed $NH_3$ sensor that provides a current mid-bed $NH_3$ amount, each of the mid-bed sensors operationally coupled to the exhaust stream at the mid-bed position;
a controller, comprising:
a system conditions module structured to interpret the current mid-bed $NO_x$ amount, the current mid-bed $NH_3$ amount, and a current mid-bed ammonia to $NO_x$ ratio (ANR);
a $NO_x$ modeling module structured to determine a feedforward mid-bed $NO_x$ target and a mid-bed ANR constraint;
a $NO_x$ control module structured to provide an ANR command in response to the feedforward mid-bed $NO_x$ target; and
a reductant injector operatively coupled to a reductant source and to the exhaust stream at a position upstream of the SCR catalyst component, wherein the reductant injector is responsive to the ANR command.

15. The system of claim 14, wherein the system conditions module is further structured to interpret an SCR catalyst space velocity, an SCR catalyst temperature, and an engine $NO_x$ output amount, and wherein the $NO_x$ modeling module is further structured to determine the ANR constraint in response to the SCR catalyst space velocity, the SCR catalyst temperature, and the engine $NO_x$ output amount.

16. The system of claim 15, further comprising an upstream $NO_x$ sensor operationally coupled to the exhaust stream at a position upstream of the SCR catalyst component, wherein the upstream $NO_x$ sensor provides the engine $NO_x$ output amount.

17. The system of claim 16, further comprising a particulate filter positioned upstream of the SCR catalyst component.

18. The system of claim 17, wherein the upstream $NO_x$ sensor is positioned upstream of the particulate filter.

19. The system of claim 17, wherein the upstream $NO_x$ sensor is positioned downstream of the particulate filter.

20. The system of claim 15, wherein the system conditions module is further structured to interpret an SCR catalyst space velocity, an SCR catalyst temperature, and an engine $NO_x$ output amount, and wherein the $NO_x$ modeling module is further structured to determine the feedforward mid-bed $NO_x$ target in response to the SCR catalyst space velocity, the SCR catalyst temperature, and the engine $NO_x$ output amount.

21. The system of claim 20, further comprising a $NO_x$ reference module structured to provide an adjusted feedforward mid-bed $NO_x$ target in response to the mid-bed ARN constraint and the current mid-bed ANR, and wherein the $NO_x$ control module is further structured to provide the ANR command in response to the adjusted feedforward mid-bed $NO_x$ target.

22. The system of claim 21, wherein the controller further comprises a $NO_x$ error determination module structured to determine a $NO_x$ error term in response to the adjusted mid-bed $NO_x$ target and the current mid-bed $NO_x$, and wherein the $NO_x$ control module is further structured to provide the ANR command in response to the $NO_x$ error term.

23. The system of claim 22, wherein the system conditions module is further structured to correct the current mid-bed $NO_x$ amount for $NH_3$ cross-sensitivity in response to the current mid-bed $NH_3$ amount.

24. A system, comprising:
an engine producing an exhaust stream as a byproduct of operation;
an SCR catalyst component having a mid-bed position between two segments of SCR catalyst, the SCR catalyst component positioned to receive at least a portion of the exhaust stream;
a mid-bed $NO_x$ sensor that provides a current mid-bed $NO_x$ amount, and a mid-bed $NH_3$ sensor that provides a mid-bed $NH_3$ amount, each of the mid-bed sensors operationally coupled to the exhaust stream at the mid-bed position;
a reductant injector operatively coupled to a reductant source and to the exhaust stream at a position upstream of the SCR catalyst component;
a means for determining a mid-bed $NO_x$ target in response to the mid-bed $NO_x$ amount and the mid-bed $NH_3$ amount, wherein the means for determining the mid-bed $NO_x$ target further comprises a means for determining a mid-bed ammonia to $NO_x$ (ANR) constraint;
means for interpreting an SCR catalyst space velocity, an SCR catalyst temperature, and an engine $NO_x$ output amount, and wherein the means for determining the mid-bed $NO_x$ target is further structured to determine the ANR constraint in response to the SCR catalyst space velocity, the SCR catalyst temperature, and the engine $NO_x$ output amount; and
a means for controlling the reductant injector in response to the mid-bed $NO_x$ target.

25. The system of claim 24, further comprising a means for correcting the current mid-bed $NO_x$ amount for a cross-sensitivity of the mid-bed $NO_x$ sensor.

* * * * *